(12) United States Patent
Lohwasser et al.

(10) Patent No.: US 6,652,957 B1
(45) Date of Patent: *Nov. 25, 2003

(54) STERILIZABLE FILM COMPOSITE FOR PACKING PURPOSES

(75) Inventors: Wolfgang Lohwasser, Gailingen (DE); Olaf Frei, Siblingen (CH)

(73) Assignee: Alcan Technology & Management Ltd., Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/856,573

(22) PCT Filed: Feb. 12, 1999

(86) PCT No.: PCT/EP99/09393

§ 371 (c)(1),
(2), (4) Date: May 24, 2001

(87) PCT Pub. No.: WO00/34036

PCT Pub. Date: Jun. 15, 2000

(30) Foreign Application Priority Data

Dec. 8, 1998 (EP) ............................................. 98811206

(51) Int. Cl.$^7$ ........................... B32B 7/02; B32B 27/36; B65D 65/40

(52) U.S. Cl. ....................... 428/216; 428/215; 428/334; 428/336; 428/451; 428/480

(58) Field of Search ....................... 427/255.31, 255.37; 428/215, 216, 334, 336, 451, 480

(56) References Cited

U.S. PATENT DOCUMENTS

| | | | |
|---|---|---|---|
| 3,442,686 A | 5/1969 | Jones | 428/336 |
| 5,084,356 A | 1/1992 | Deak et al. | 428/458 |
| 5,100,720 A | 3/1992 | Sawada et al. | 428/215 |
| 5,508,075 A | 4/1996 | Roulin et al. | 428/35.7 |
| 5,670,224 A | 9/1997 | Izu et al. | 428/35.8 |
| 5,770,301 A | 6/1998 | Murai et al. | 428/213 |
| 5,830,545 A | 11/1998 | Frisk | 428/34.7 |
| 5,955,181 A | 9/1999 | Peiffer et al. | 428/212 |
| 6,027,793 A | 2/2000 | Lohwasser et al. | 428/216 |
| 6,277,496 B1 | 8/2001 | Lohwasser et al. | 428/469 |
| 6,428,882 B1 | 8/2002 | Peiffer et al. | 428/220 |
| 6,517,932 B1 | 2/2003 | Peiffer et al. | 428/216 |
| 6,548,108 B1 | 4/2003 | Lohwasser et al. | 427/162 |

FOREIGN PATENT DOCUMENTS

| | | |
|---|---|---|
| EP | 0 484 275 A1 | 10/1991 |
| WO | 98/53115 | 11/1998 |

OTHER PUBLICATIONS

International Search Report, PCT/EP99/09393, Feb. 22, 2000.

*Primary Examiner*—D. S. Nakarani
(74) *Attorney, Agent, or Firm*—Fisher, Christen & Sabol

(57) ABSTRACT

A film composite for packaging purposes. The film composite efficiently blocks the passage of water vapor and gas after sterilization in a water bath or in water vapor at temperatures of more than 90° C., and is a film consisting of polyethylene terephthalate (PET) with a coextruded layer consisting of polyethlene-2,6-naphthalate (PEN) on at least one side. The film has a 10 nm to 200 nm thick ceramic layer on at least one of the sides that are coated with PEN. The layer is produced by simultaneously vaporizing silicon dioxide ($SiO_2$) and metallic silicon in a vacuum. The layer consists of $SiO_x$, x being a number between 0.9 and 2. The composite film blocks the passage of water vapor and gases to a large extent after sterilization in a water bath or in water vapor at temperatures of more than 90° C.

11 Claims, No Drawings

STERILIZABLE FILM COMPOSITE FOR PACKING PURPOSES

This application is a 371 U.S. National Stage Application of PCT/EP99/09393, filed on Dec. 2, 1999, which has priority benefit of European Patent Application 98811206.6, filed on Dec. 8, 1998.

BACKGROUND OF THE INVENTION

1. Field of the Invention

The invention concerns a composite film for packaging purposes with good permeability barrier effect for water vapor and gases after sterilization in a water bath or in water vapor at temperatures of more than 90° C., where the composite film also has as a substantial constituent a barrier layer with $SiO_x$ which is produced by the vaporization of inorganic materials. Also within the framework of this invention lies a process for the production of the composite film and its usage.

2. Background

In a recognized method of prolonging the durability of perishable products such as foodstuffs, the products are sterilized in a packaged state. To achieve this the filling material is heated briefly in its sealed packaging by autoclaving in hot water or water vapor at temperatures of up to 130° C.

The known transparent composite films used today for packaging foodstuffs often lack sufficient barrier properties to water vapor, oxygen and aromas after sterilization treatment. Examples are ethylvinyl alcohols (EVOH) and copolymers of EVOH and polyethylene (PE), the barrier properties of which deteriorate especially in very moist conditions, resulting in a milky appearance. Better barrier properties are achieved by coating a silicon monoxide-coated film of polyethylene terephthalate, but when heated at high temperatures these films show not only a yellowish discoloration but also a decrease in barrier properties.

BROAD DESCRIPTION OF THE INVENTION

The invention is therefore based on the task of creating a composite film of the type described initially which shows improved barrier properties with regard to water vapor, oxygen and aromas after sterilization treatment in comparison with state of the art transparent film laminates.

The solution of the task according to the invention leads to the composite film comprising a film of polyethylene terephthalate (PET) with a coextruded layer of polyethylene-2,6-naphthalate (PEN) on at least one side, and the film on at least one of the PEN-coated sides has a 10 to 200 nm thick ceramic layer of $SiO_x$, where x is a number between 0.9 and 2, produced by the simultaneous vaporization of silicon dioxide ($SiO_2$) and metallic silicon in a vacuum.

The term PEN is used below to mean not only the pure polymer but also a mixture of polymers consisting of at least 60 w. % ethylene-2,6-naphthalate units and up to 40 w. % ethylene terephthalate units and or units of cycloaliphatic or aromatic diols and or dicarbonic acids.

DETAILED DESCRIPTION OF THE INVENTION

The preferred PEN layer has a polymer consistency of at least 65 w. % ethylene-2,6-naphthalate units and up to 35 w. % ethylene terephthalate units. Particularly preferred is a PEN layer with a polymer consistency of at least 70 w. % ethylene-2,6-naphthalate units and up to 30 w. % ethylene terephthalate units. As stated above, the PEN layer can, however, consist entirely of ethylene-2,6-naphthalate polymers.

Suitable aliphatic diols are for example diethylene glycol, triethylene glycol, aliphatic glycols of the general formula $HO-(CH_2)n-OH$, whereby n is an integer between 3 and 6 (in particular propane-1,3-diol, butane-1,4-diol, pentane-1,5-diol, and hexane-1,6-diol) or branched chain aliphatic glycols with up to 6 carbon atoms. Suitable cycloaliphatic diols include cyclohexane diols (in particular cyclohexane-1,4-diol). Other suitable aromatic diols correspond for example to the formula $HO-C_6H_4-X-C_6H_4-OH$, where X stands for $-CH_2-$, $-C(CH_3)_2-$, $-C(CF_3)_2-$, $-O-$, $-S-$, or $SO_2$. In addition to the above, bisphenols of the formula $HO-C_6H_4-C_6H_4-OH$ are suitable.

Preferred aromatic dicarbonic acids are benzo-dicarbonic acids, naphthalene dicarbonic acids (for example, naphthalene-1,4 or 1,6-dicarbonic acids), biphenyl-x,x'-dicarbonic acids (in particular, biphenyl-4,4'-dicarbonic acids), diphenylacetylene-x,x'-dicarbonic acids (in particular, diphenylacetylene-4,4'-dicarbonic acids) or stilbene-x,x'-dicarbonic acids. Of the cycloaliphatic dicarbonic acids, cyclohexane dicarbonic acids should be mentioned. Of the aliphatic dicarbonic acids the ($C_3$-$C_{19}$) alkane diacids are particularly suitable, when the alkane part is either in a straight chain or can be branched.

A preferred method of producing PEN/PET film includes the following steps:
 a) production of the film by coextrusion,
 b) biaxial extension of the film, and
 c) thermofixing of the extended film.

The PEN layer can be arranged on one or both sides of the PET film. A unilateral attachment of the PEN layer is preferred where a further layer of PET containing extra antiblocking agents can be attached to the side facing away from the PEN layer.

The PEN layer preferably has a thickness of 0.1 to 4 µm, in particular 0.2 to 2 µm. The preferred thickness of the ceramic layer of $SiO_x$ lies between 40 and 150 nm.

In the first preferred variant the x of the $SiO_x$ ceramic layer is a number between 0.9 and 1.2. After sterilization, a film coated in this way has an oxygen barrier which is 10 times better than that of state of the art films, although there is a degree of yellowing.

In the second preferred variant the x of the $SiO_x$ ceramic layer is a number between 1.3 and 2, in particular between 1.5 and 1.8. A film coated in this way shows even better barrier properties after sterilization treatment and in particular shows no discoloration.

Depending on its application, the composite film ultimately to be used for packaging purposes may contain, in addition to the PEN/PET film coated with $SiO_x$, further films for example films made out of PET or an oriented polyamide (oPA), or the composite film can be coated, in order to control the sealing qualities, with a sealing layer made for example of polypropylene (PP) or polyethylene (PE). The joining of the individual films into a composite film is usually achieved by means of polyurethane-based laminate adhesives.

The ceramic $SiO_x$ layers can for example be deposited onto the PEN/PET film by processes in thin-film vacuum technology, preferably by electrode beam vaporization, where in any such case, the ceramic layer is arranged as an interface layer on the PEN-coated side of the composite film and is covered by a further film layer or a laminate adhesive.

By means of a thin-film vacuum process, which is known in itself, a 10 nm to 200 nm thick ceramic layer of $SiO_x$, where x is a number between 0.9 and 2, is deposited by the simultaneous vaporization in a vacuum of silicon dioxide ($SiO_2$) and metallic silicon. The film coated with the ceramic layer is then laminated with the other films, which can also be printed, into a composite film.

It is preferable that the $SiO_2$ and Si are vaporized together from a single vaporization source, i.e., from a mixture of $SiO_2$ and Si.

To produce a ceramic $SiO_x$ layer, where x is a number between 1.3 and 2, further substances can be added to the $SiO_2$ as the materials to be vaporized, such as, $Al_2O_3$, $B_2O_3$, and MgO in quantities of up to 50 mol %, preferably 5 to 30 mol %, always in relation to $SiO_2$.

Further additives which can be added to the materials for vaporization are, for example, Al, B and or Mg in their pure form or as Si alloys, in quantities of up to 50 mol %, preferably 5 to 30 mol %, always in relation to Si.

The quantity ratio of $SiO_2$, $Al_2O_3$, $B_2O_3$, and MgO to Si, Al, B and Mg is for example set such that stoichiometrically it gives an oxygen deficiency of between 10 and 30% in relation to the sums of the pure oxides in the vaporized material.

The coating process is controlled by the material vaporization rate, the deposit rate on the substrate and the exposure period of the substrate in the vacuum chamber atmosphere, such that it produces the desired layer thickness of the $SiO_x$ coating.

In the production of a ceramic layer of $SiO_x$, where x is a number between 0.9 and 1.2, instead of a simultaneous vaporization of $SiO_2$ and Si, silicon monoxide (SiO) can be vaporized.

A plasma pretreatment of the PEN/PET film before the $SiO_x$ coating leads to a further improvement in barrier properties against water vapor and oxygen.

The composite film according to the invention is particularly suitable for the production of flexible packaging such as sachets and as a covering material for sealing containers. One particularly preferred application for the composite film according to the invention is for the packaging of basic and luxury food items which are sterilized in their packaged state in a water bath or water vapor at temperatures of more than 90° C.

The composite film according to the invention is also suitable for use as a barrier material in the technical and medical arenas.

The superiority of the composite film according to the invention in comparison with the usual materials in use today with regard to barrier effect against oxygen and water vapor is supported by the measurement results for the said characteristics compiled in Table 1 and Table 2. The composite films tested have the following composition:
1. PET, coated with SiO/PET/PP
2. PET, coated with $SiO_{1.6}$/PET/PP
3. PET (12 μm)-PEN (1 μm), coextruded and coated with SiO(100 μm)/PET/PP
4. Layer structure as in 3 but coated with a ceramic layer of the $SiO_{1.6}$ compound.

Composite film No. 1 is a commercially available packaging film described as sterilizable and serves here as a comparison example. Similarly composite film No. 2 is a comparison example. Composite films Nos. 3 and 4 are the composite films according to the invention with ceramic layers of differing composition: this corresponds in composite No. 3 to the SiO formula and in composite No. 4 to the $SiO_{1.6}$ formula.

TABLE 1

Oxygen barriers at 25° C. and 50% r.h. $cm^3/(m^2$ 24 h bar)

| Composition Number | Before Sterilization | After Sterilization At 121° C. 30 mins | Before Sterilization At 130° C. 30 mins | After Sterilization 50 Gelboflex cycles* |
|---|---|---|---|---|
| 1 | 0.3 | 0.3 | 7.0 | 1.8 |
| 2 | 0.2 | 7.0 | 15.0 | 1.8 |

TABLE 1-continued

Oxygen barriers at 25° C. and 50% r.h. $cm^3/(m^2$ 24 h bar)

| Composition Number | Before Sterilization | After Sterilization At 121° C. 30 mins | Before Sterilization At 130° C. 30 mins | After Sterilization 50 Gelboflex cycles* |
|---|---|---|---|---|
| 3 | 0.07 | 0.08 | 0.12 | 0.4 |
| 4 | 0.08 | 0.5 | 0.7 | 0.5 |

TABLE 2

Water vapor barriers at 25° C. and 100% r.h. in $g/(m^2$ 24 h bar)

| Composition Number | Before Sterilization | After Sterilization At 121° C. 30 mins | Before Sterilization At 130° C. 30 mins | After Sterilization 50 Gelboflex cycles* |
|---|---|---|---|---|
| 1 | 0.3 | 0.3 | 0.8 | 0.3 |
| 2 | 0.2 | 0.8 | 1.2 | 0.3 |
| 3 | 0.1 | 0.1 | 0.1 | 0.1 |
| 4 | 0.1 | 0.2 | 0.3 | 0.1 |

*crushing test according to ASTM standard 397–74.

What is claimed is:

1. A composite film for packaging purposes that retains effective permeability barrier effect for water vapor and gases after sterilization in a water bath or in water vapor at a temperature of more than 90° C., where the composite film also has a substantial constituent a barrier layer with $SiO_x$ produced by the vaporization of inorganic materials, the composite film comprises a film of polyethylene terephthalate (PET) with a coextruded layer of polyethylene-2,6-naphthalate (PEN) on at least one side and the film on at least one of the PEN-coated sides has a 10 nm to 200 nm thick ceramic layer of $SiO_x$, where x is a number between 0.9 and 2, produced by the simultaneous vaporization of silicon dioxide ($SiO_2$) and metallic silicon or by the vaporization of silicon monoxide (SiO) in a vacuum.

2. The composite film according to claim 1, wherein the PEN layer has a thickness of 0.1 to 4 μm.

3. The composite film according to claim 2, wherein the ceramic layer of $SiO_x$ has a thickness of between 40 and 150 nm.

4. The composite film according to claim 3, wherein the x of the ceramic layer of $SiO_x$ is a number between 0.9 and 1.2.

5. The composite film according to claim 3, wherein the x of the ceramic layer of $SiO_x$ is a number between 1.3 and 2.

6. The composite film according to claim 3, wherein the x of the ceramic layer of $SiO_x$ is a number between 1.5 and 1.8.

7. The composite film according to claim 1, wherein the PEN layer has a thickness of 0.2 to 2 μm.

8. The composite film according to claim 1, wherein the ceramic layer $SiO_x$ has a thickness of between 40 and 150 nm.

9. The composite film according to claim 1, wherein the x of the ceramic layer of $SiO_x$ is a number between 0.9 and 1.2.

10. The composite film according to claim 1, wherein the x of the ceramic layer of $SiO_x$ is a number between 1.3 and 2.

11. The composite film according to claim 1, wherein the x of the ceramic layer of $SiO_x$ is a number between 1.5 and 1.8.

* * * * *